United States Patent

Yoshimura

[11] Patent Number: 5,822,985
[45] Date of Patent: Oct. 20, 1998

[54] EXHAUST PASSAGE STRUCTURE OF OUTBOARD MOTOR UNIT

[75] Inventor: Masaaki Yoshimura, Shizuoka-Ken, Japan

[73] Assignee: Suzuki Kabushiki Kaisha, Japan

[21] Appl. No.: 687,020

[22] Filed: Jul. 25, 1996

[30] Foreign Application Priority Data

Jul. 31, 1995 [JP] Japan ..................................... 7-195581

[51] Int. Cl.⁶ ...................................................... F01N 3/28
[52] U.S. Cl. ............................................... 60/302; 440/89
[58] Field of Search ............................ 60/299, 302, 312, 60/314; 440/89

[56] References Cited

U.S. PATENT DOCUMENTS

| 5,174,112 | 12/1992 | Sougawa et al. | 60/302 |
| 5,346,417 | 9/1994 | Isogawa | 60/302 |
| 5,378,180 | 1/1995 | Nakayama et al. | 440/89 |
| 5,433,634 | 7/1995 | Nakayama et al. | 60/299 |
| 5,494,467 | 2/1996 | Sohgawa et al. | 440/89 |
| 5,546,748 | 8/1996 | Iwai et al. | 60/302 |
| 5,556,311 | 9/1996 | Fujimoto | 440/89 |

FOREIGN PATENT DOCUMENTS

HEI 5-52112  3/1993  Japan.
HEI 6-146876 5/1994 Japan.

Primary Examiner—Willis R. Wolfe
Attorney, Agent, or Firm—Rader, Fishman & Grauer

[57] ABSTRACT

An exhaust passage structure is provided for an outboard motor unit having an engine holder mounted to a hull through a bracket, an engine disposed to an upper portion of the engine holder, a drive shaft housing disposed to a lower portion of the engine holder and an exhaust passage structure extending from the engine into water through the drive shaft housing. The exhaust passage structure has an improvement in which first and second exhaust expansion chambers are disposed on the way of an exhaust passage of the exhaust passage structure, the second exhaust expansion chamber is disposed to an upper portion of the engine holder, an exhaust tube is disposed on an upstream side of another exhaust passage which communicates the second exhaust expansion chamber with the water so that an upstream side opening of the exhaust tube is directed upward in a mounted state. The opening is opened at a position between the location of the bracket, preferably the catalyst disposed in the first exhaust expansion chamber, and an upper end of the engine cylinder so that the water does not enter the second exhaust expansion chamber even if a draft line of the water rises.

5 Claims, 2 Drawing Sheets

EXHAUST PASSAGE STRUCTURE OF OUTBOARD MOTOR UNIT

BACKGROUND OF THE INVENTION

The present invention relates to an exhaust passage structure of an outboard motor unit.

Recently, in order to prevent air contamination and water contamination, catalyst is disposed on the way of an exhaust passage of an outboard motor unit and downstream side of an exhaust expansion chamber so as not to prevent the flow of the exhaust gas, and an attention is paid to the location of the catalyst above the draft line of a hull because the catalyst is degraded or damaged in contact with water component such as sea water.

For example, such location of the catalyst is disclosed in Japanese Patent Laid-open Publication Nos. HEI 5-52112 and 6-146876.

In an outboard motor shown in the Japanese Patent Laid-open Publication No. HEI 5-52112, a catalyst is disposed to an upper end of a second exhaust tube of an exhaust expansion chamber formed in a drive shaft housing, and in such location of the catalyst, it is necessary to extend upward the drive shaft housing or to extend the exhaust expansion chamber far above the drive shaft housing so that the catalyst does not contact the sea water when the draft line of the sea water rises, thus being troublesome and disadvantageous.

Furthermore, in an outboard motor shown in the Japanese Patent Laid-open Publication No. HEI 6-146876, an exhaust expansion chamber is formed below an engine unit and a first exhaust passage is also formed so as to open to the exhaust expansion chamber. A second exhaust passage is further formed so as to communicate the exhaust expansion chamber with an underwater exhaust port, and a portion on the way of the second exhaust passage is bent to provide a counterflow preventing section. According to such structure, an exhaust resistance increases and, hence, an engine power is reduced.

SUMMARY OF THE INVENTION

An object of the present invention is to substantially eliminate the problems or defects mentioned above and to provide an exhaust passage structure of an outboard motor unit capable of reducing an exhaust resistance with an exhaust pass age having less bent structure.

Another object of the present invention is to provide an exhaust passage structure of an outboard motor unit capable of preventing a catalyst from being degraded in contact with a sea water, for example.

A further object of the pre sent invention is to provide an exhaust passage structure of an outboard motor unit capable of cooling an exhaust gas after passing the catalyst and preventing a drive shaft housing from increasing in temperature.

A still further object of the present invention is to provide an exhaust passage structure of an outboard motor unit capable of reducing a manufacturing cost and improving an assembling performance.

These and other objects can be achieved according to the present invention by providing an exhaust passage structure of an outboard motor unit having an engine holder mounted to a hull through a bracket, an engine disposed to an upper portion of the engine holder, a drive shaft housing disposed to a lower portion of the engine holder and an exhaust passage structure extending from the engine into water through the drive shaft housing, the improvement in which first and second exhaust expansion chambers are disposed on the way of an exhaust passage of the exhaust passage structure, the second exhaust expansion chamber is disposed to an upper portion of the engine holder, an exhaust tube is disposed on an upstream side of another exhaust passage which communicates the second exhaust expansion chamber with the water so that an upstream side opening of the exhaust tube is directed upward in a mounted state, the opening being opened at a position between the location of the bracket and an upper end of an engine cylinder so that the water does not enter the second exhaust expansion chamber even if a draft line of the water rises.

In a preferred embodiment, a catalyst is disposed in the first exhaust expansion chamber, and the opening of the exhaust tube is opened at a position between the location of the catalyst and the upper end of the engine cylinder.

A cooling water jacket is disposed around the second exhaust expansion chamber. The first and second exhaust expansion chambers are integrally formed with each other.

According to the present invention of the characters described above, the opening of the exhaust tube is opened at a portion at which the water does not enter the second exhaust expansion chamber even if a draft line of the water rises. Preferably, this position is between the location of the catalyst or bracket and the upper end of the engine cylinder. The catalyst is disposed inside the first exhaust expansion chamber. Accordingly, it is not necessary to bend the exhaust passage to provide a counterflow preventing section, thus reducing the exhaust resistance and preventing the catalyst from contacting the water such as sea water.

The location of the cooling water jacket around the second exhaust expansion chamber prevents the drive shaft housing from increasing in temperature and weakens the exhaust noise.

The manufacturing cost may be reduced by integrally forming the first exhaust expansion chamber and the exhaust passage which will result in the improvement of the assembling performance of the outboard motor unit.

The nature and further characteristic features of the present invention will be made more clear from the following descriptions made with reference to the accompanying drawings.

DESCRIPTION OF THE PREFERRED EMBODIMENT

Figure 1:
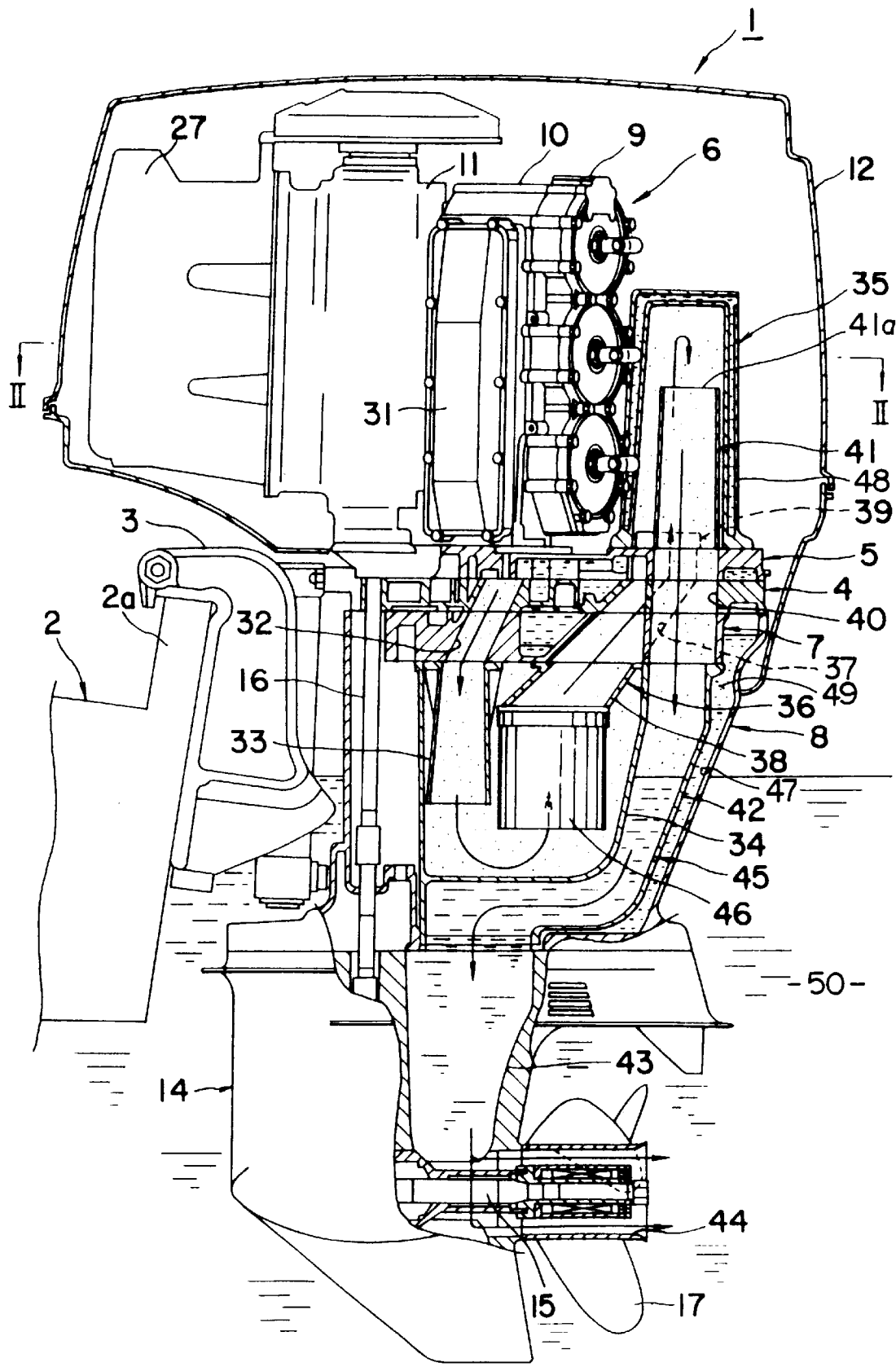
FIG. 1 is an elevational section of an outboard motor unit according to one embodiment of the present invention.

With reference to FIG. 1, an outboard motor unit 1 according to the embodiment of the present invention is mounted to a transom 2a of a hull 2 through a bracket 3. The outboard motor unit 1 is equipped with an engine holder 4 connected to the bracket 3. An engine 6 is disposed at an upper portion of the engine holder 4 through an oil seal housing 5 and a drive shaft housing 8 is also disposed at a lower portion of the engine holder 4 through an exhaust manifold 7.

Figure 2:
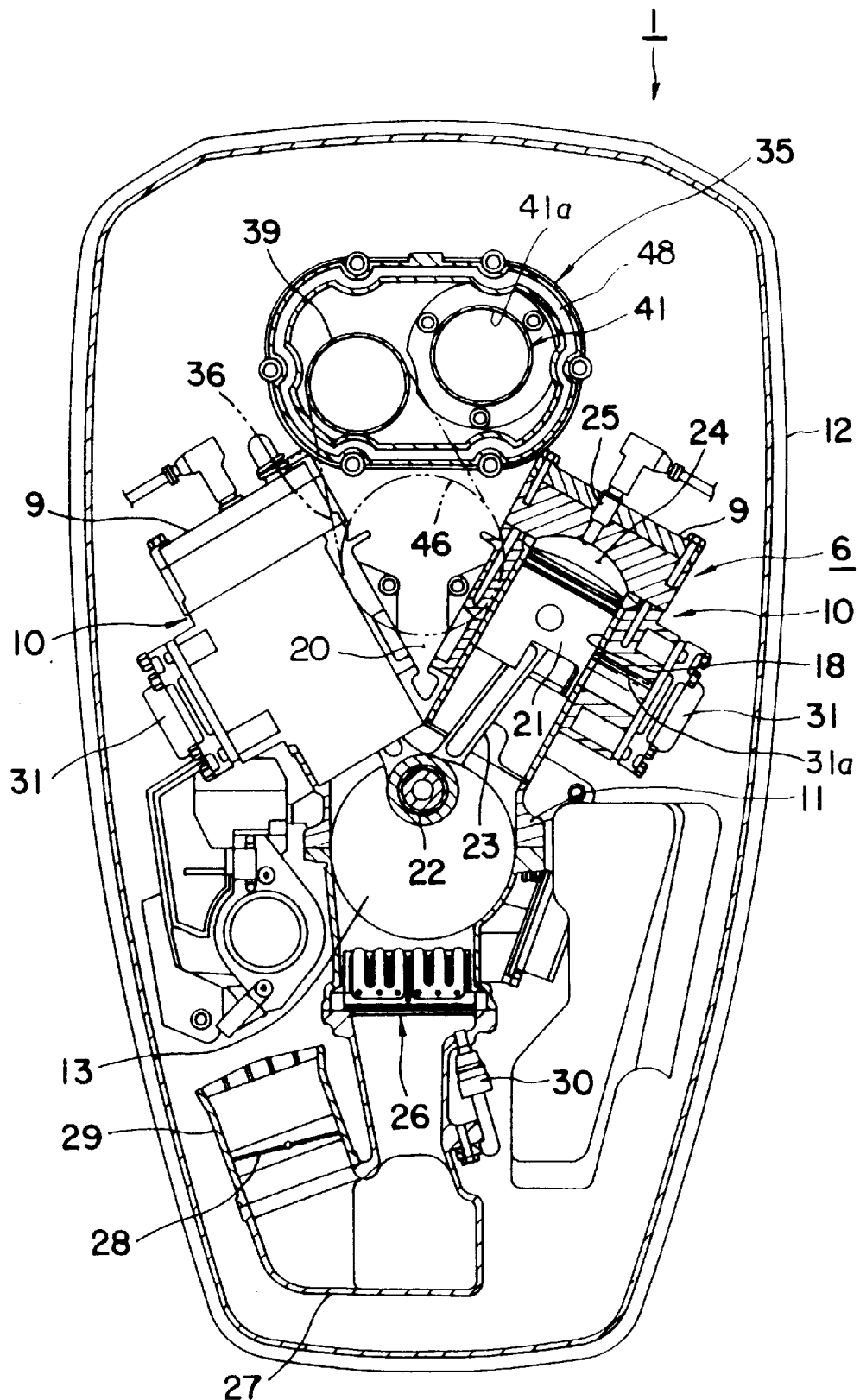
FIG. 2 is a sectional view taken along the line II—II in FIG. 1.

As shown in FIGS. 1 and 2, the engine 6 is for example a water cooled two-stroke-cycle V-type six-cylinder engine, which is composed of a cylinder head 9, a cylinder block 10, a crank case 11, etc, and a pair of cylinder blocks 10 are arranged so as to provide a V-shape, thus providing a V bank 20 between the cylinder blocks 10. The engine 6 is covered by an engine cover 12, and a crank shaft 13 is mounted perpendicularly as viewed in the crank case 11 to be rotatable.

A gear case 14 is disposed below the drive shaft housing 8 and a propeller shaft 15 driven by the engine 6 is supported to be rotatable. The rotation of the engine 6 is transmitted to the propeller shaft 11 through a drive shaft 16 connected to the crank shaft 13 and a bevel gear, not shown, to thereby drive a propeller 17 supported to a rear end of the propeller shaft 11.

Pistons 21 are fitted into the respective cylinders of the cylinder assembly 18 and the pistons 21 are connected to crank pins 22 of the crank shaft 13 through connection rods 23 in a manner that reciprocal strokes of the pistons 21 are converted to rotational motion of the crank shaft 13. A combustion chamber 24 is formed to a connection portion between the cylinder head 9 and the cylinder block 10, and an ignition plug 25 is screwed to a central portion of the combustion chamber from the outside thereof.

A lead valve unit 26 as a suction valve unit is disposed in the crank case 11. A surge tank 27 is disposed on the upstream side of the lead valve unit 26 and a suction tube 29 provided with a throttle 28 is also connected to a further upstream side thereof. In the surge tank 27, a fuel injector 30 is mounted from an external side so as to jet a fuel towards the upstream side of the lead valve unit 26.

Exhaust ports 31a are formed to the inner peripheral surfaces of the respective cylinders at portions outside the V-bank 20, and these exhaust ports are covered by an exhaust gas collecting cover 31, which serves to converge the exhaust gas exhausted through the respective cylinders. The lower portion of the exhaust gas collecting cover 31 is communicated with a first exhaust hole, i.e. passage, 32 formed vertically through an oil seal housing 5, the engine holder 4 and the exhaust manifold 7 and communicated with a first exhaust tube 33 connected to the first exhaust hole 32.

A first exhaust expansion chamber 34 is formed to the lower portion of the exhaust manifold 7 in the drive shaft housing 8, and in the expansion chamber 34, the first exhaust tube 33 is disposed so as to extend vertically as viewed. A second exhaust chamber 35 is also formed to the upper portion of the oil seal housing 5 on the rear side of the cylinder head 9 of the engine 6 with respect to the advancing direction of the hull 2. These first and second exhaust expansion chambers 34 and 35 are communicated with each other through a communication passage 36 formed substantially vertically. The communication passage 36 is composed of a communication hole 37 formed through the oil seal housing 5, the engine holder 4 and the exhaust manifold 7, a second exhaust tube 38 connected to the communication hole 37 and disposed in the first exhaust expansion chamber 34, and a third exhaust tube 39 connected to the communication hole 37 and disposed in the second exhaust expansion chamber 35.

The oil housing 5, the engine holder 4 and the exhaust manifold 7 are formed with a second exhaust hole 40 adjacent to the communication hole 37 in a vertical fashion as viewed. A fourth exhaust tube 41 is arranged inside the second exhaust expansion chamber 35 above the second exhaust hole 40 so that the upstream side opening 41a is directed upward and the fourth exhaust tube 41 is also connected to the exhaust hole 40. The position of the opening 41a of the fourth exhaust tube 41 is set at a sufficiently high position so that, for example, sea water does not invade into the second exhaust expansion chamber 35 even if a draft surface of the sea water rises. That is, in the concrete structure of a preferred embodiment, as shown in FIG. 1, in the outboard motor unit being mounted state, the lower limit of the position of the opening 41a will be above the location of the bracket 3 or a catalyst 46, mentioned hereinafter, and the upper limit thereof will be the upper end of the engine cylinder.

A first exhaust passage 42 is disposed below the second exhaust hole 40 in an integral manner with respect to the first exhaust expansion chamber 34. The first exhaust passage 42 has an outlet side end connected to a second exhaust passage 43 formed in the gear case 14. The second exhaust passage 43 extends into water through an exhaust gas discharge passage 44 formed around the propeller shaft 15. As mentioned above, according to this embodiment, the exhaust passage structure 45 is composed of the first exhaust hole 32, the first exhaust tube 33, the communication passage 36 (including the communication hole 37 and the second and third exhaust tubes 38 and 39), the fourth exhaust tube 41, the second exhaust hole 40, the first exhaust passage 42, the second exhaust passage 43 and the exhaust gas discharge passage 44.

In the arrangement of the outboard motor unit of the structure described above, a catalyst means 46 is disposed at an opening portion on the side of the first exhaust expansion chamber 34 of the communication passage 36, i.e. at a portion below the second exhaust tube 38.

A first water jacket 47 is formed around the first exhaust expansion chamber 34 and the first exhaust passage 43, and a second water jacket 48 is also formed around the second exhaust expansion chamber 35, in which the cooling water fills.

The embodiment of the structure described above will operate as follows.

The exhaust gas discharged from the respective cylinders of the cylinder assembly 18 of the engine 6 is once converged and collected by the exhaust gas collection cover 31, and then, guided to the first exhaust expansion chamber 34 by way of the first exhaust hole 32 and the first exhaust tube 33. The exhaust gas guided to the first exhaust expansion chamber 34 is cleaned by passing through the catalyst 46, and then, guided to the second exhaust expansion chamber 35 by way of the communication passage 36. The exhaust gas is thereafter discharged from the second exhaust expansion chamber 35 into water through the fourth exhaust tube 41, the second exhaust hole 40, the first exhaust passage 42, the second exhaust passage 43 and the exhaust gas discharge passage 44.

According to the present invention, the first exhaust expansion chamber 34 is disposed below the engine holder 4, the second exhaust expansion chamber 35 is disposed above the engine holder 4, both chambers 34 and 35 being communicated through the communication passage 36, and the first exhaust passage 42 integrally formed with the first exhaust expansion chamber 34 extends downward. According to such structure, the bent structure of the exhaust passage 45 can be eliminated and, hence, it is not necessary to bend the intermediate portion of the exhaust passage 45 as in the conventional structure, thus reducing the exhaust resistance and utilizing the pulsation of the exhaust gas to thereby prevent the lowering of the engine power.

Furthermore, at the time of engine operation stopping or idling, water such as sea water fills partially the first exhaust passage 42 as shown in FIG. 1, and at the time of rapid engine speed reduction, the sea water 50 is raised up to the first exhaust passage 42 by means of the negative pressure caused in the exhaust passage 45. However, according to the present invention, since the fourth exhaust tube 41 is arranged so that the upstream side opening 41a thereof is directed upward in the second exhaust expansion chamber 35 at a portion sufficiently high to prevent the sea water 50 from entering the second exhaust expansion chamber 35 even if the draft line of the sea water rises, thus preventing the sea water 50 from directly contacting the catalyst 46.

Still furthermore, because the exhaust gas has a high temperature and a high pressure, there is a fear of increasing the temperature and the exhaust noise in the exhaust passage 45. However, according to the present invention, the first and second exhaust expansion chambers 34 and 35 on the way of the exhaust passage 45 and the first and second water jackets 47 and 48 are arranged around these chambers 34 and 35, so that the exhaust gas is cooled and the temperature of the drive housing 8 can be hence prevented from increasing and the exhaust noise can be also weakened.

According to the integral structure of the first exhaust expansion chamber 34 with the first exhaust passage 42, the manufacturing cost can be reduced and the assembling performance can be also improved.

Although, in the described embodiment, the catalyst 46 is disposed within the first exhaust expansion chamber 34, it may be disposed within the second exhaust expansion chamber 35.

What is claimed is:

1. In an exhaust passage structure of an outboard motor unit having an engine holder mounted to a hull through a bracket, an engine disposed to an upper portion of the engine holder, a drive shaft housing disposed to a lower portion of the engine holder and an exhaust passage structure extending from the engine into water through the drive shaft housing, the improvement in which first and second exhaust expansion chambers are formed on the way of an exhaust passage of the exhaust passage structure, said second exhaust expansion chamber is disposed to an upper portion of the engine holder, an exhaust tube is formed on an upstream side of another exhaust passage which communicates said second exhaust expansion chamber with the water so that an upstream side opening of the exhaust tube is directed upward in a mounted state, said opening being opened at a position between the location of the bracket and an upper end of an engine cylinder so that the water does not enter the second exhaust expansion chamber even if a draft line of the water rises.

2. An exhaust passage structure according to claim 1, wherein a catalyst is disposed in said first exhaust expansion chamber.

3. An exhaust passage structure according to claim 1, wherein said opening of the exhaust tube is opened at a postion between the location of the catalyst and the upper end of the engine cylinder.

4. An exhaust passage structure according to claim 1, wherein a cooling water jacket is disposed around said second exhaust expansion chamber.

5. An exhaust passage structure according to claim 1, wherein said first and second exhaust expansion chambers are integrally formed with each other.

* * * * *